(12) United States Patent
Sun et al.

(10) Patent No.: US 12,208,783 B2
(45) Date of Patent: Jan. 28, 2025

(54) AUTOMOBILE BRAKE CONTROL METHOD BASED ON AN ANTI-LOCK BRAKING SYSTEM (ABS) AND SYSTEM, AND STORAGE MEDIUM

(71) Applicant: GUANGZHOU AUTOMOBILE GROUP CO., LTD., Guangzhou (CN)

(72) Inventors: Jiantao Sun, Guangzhou (CN); Houjiang Zhou, Guangzhou (CN); Peijing Lin, Guangzhou (CN); Wenhui Hou, Guangzhou (CN); Man Xu, Guangzhou (CN)

(73) Assignee: GUANGZHOU AUTOMOBILE GROUP CO., LTD., Guangdong (CN)

( * ) Notice: Subject to any disclaimer, the term of this patent is extended or adjusted under 35 U.S.C. 154(b) by 331 days.

(21) Appl. No.: 17/756,560

(22) PCT Filed: Jun. 1, 2021

(86) PCT No.: PCT/CN2021/097659
§ 371 (c)(1),
(2) Date: May 26, 2022

(87) PCT Pub. No.: WO2021/259017
PCT Pub. Date: Dec. 30, 2021

(65) Prior Publication Data
US 2022/0355773 A1    Nov. 10, 2022

(30) Foreign Application Priority Data
Jun. 24, 2020   (CN) .......................... 202010589141.7

(51) Int. Cl.
*B60T 8/1761* (2006.01)
*B60Q 9/00* (2006.01)

(52) U.S. Cl.
CPC ............ *B60T 8/17616* (2013.01); *B60Q 9/00* (2013.01); *B60T 2220/04* (2013.01);
(Continued)

(58) Field of Classification Search
CPC .............................. B60T 8/17616; B60Q 9/00
See application file for complete search history.

(56) References Cited

U.S. PATENT DOCUMENTS 4,059,312 A * 11/1977 Jonner ................ B60T 8/17633
303/122.06
5,281,012 A *  1/1994 Binder ................... B60T 8/4072
303/113.5
(Continued)

FOREIGN PATENT DOCUMENTS

CN   1477005 A    2/2004
CN   1533340 A    9/2004
(Continued)

OTHER PUBLICATIONS

First Office Action mailed to Chinese Counterpart Patent Application No. 202010589141.7 on Apr. 15, 2022.
(Continued)

*Primary Examiner* — Jess Whittington
(74) *Attorney, Agent, or Firm* — Hodgson Russ LLP

(57) ABSTRACT

An automobile brake control method comprises: obtaining wheel rotation speed sensor information of an automobile within the current measurement period; and when the wheel rotation speed sensor information satisfies a preset condition, allowing the automobile to enter an aquaplane safety logic control mode, and after an ABS operates, allowing the ABS to exit front axle control and merely control a rear axle so that a driver takes over automobile control, until the next measurement period.

9 Claims, 1 Drawing Sheet

```
┌─────────────────────────────────────────────────────────────┐
│ Acquire Information of Wheel Speed Sensor of Automobile in  │ ─── S1
│ Current Detection Period                                    │
└─────────────────────────────────────────────────────────────┘
                              │
                              ▼
┌─────────────────────────────────────────────────────────────┐
│ Allow Automobile Enter Aquaplaning Safety Logic Control Mode│ ─── S2
│ When Information of Wheel Speed Sensor Satisfies Preset     │
│ Conditions, and Allowing ABS Exit Front Axle Control and    │
│ Only Control Rear Axle after ABS Works, to Make Driver Take │
│ over Automobile Brake Control until Next Detection Period   │
└─────────────────────────────────────────────────────────────┘
```

(52) U.S. Cl.
CPC ....... *B60T 2240/00* (2013.01); *B60T 2250/04* (2013.01); *B60T 2270/10* (2013.01)

(56) References Cited

U.S. PATENT DOCUMENTS

| | | | | |
|---|---|---|---|---|
| 5,615,934 | A * | 4/1997 | Abuelsamid | B60T 8/172 303/167 |
| 2010/0168974 | A1* | 7/2010 | Bradley, IV | B60T 8/1708 303/5 |
| 2018/0134266 | A1* | 5/2018 | McKeown | B60T 8/176 |
| 2019/0299993 | A1* | 10/2019 | Inada | B60Q 1/46 |
| 2021/0284127 | A1* | 9/2021 | McKeown | B60W 10/20 |

FOREIGN PATENT DOCUMENTS

| | | |
|---|---|---|
| CN | 101896382 A | 11/2010 |
| CN | 103189252 A | 7/2013 |
| CN | 107848509 A | 3/2018 |
| CN | 109070858 A | 12/2018 |
| CN | 109878480 A | 6/2019 |
| DE | 102008034908 A1 | 3/2009 |
| JP | 2002067744 A | 3/2002 |
| JP | 2010184642 A | 8/2010 |

OTHER PUBLICATIONS

Second Office Action mailed to Chinese Counterpart Patent Application No. 202010589141.7 on Aug. 3, 2022.
Third Office Action mailed to Chinese Counterpart Patent Application No. 202010589141.7 on Oct. 17, 2022.

* cited by examiner

AUTOMOBILE BRAKE CONTROL METHOD BASED ON AN ANTI-LOCK BRAKING SYSTEM (ABS) AND SYSTEM, AND STORAGE MEDIUM

CROSS-REFERENCE TO RELATED APPLICATIONS

This application is a 371 of International Application No. PCT/CN/2021/097659, filed Jun. 1, 2021, which is based upon and claims priority to Chinese Patent Application No. 202010589141.7, filed Jun. 24, 2020, the entire contents of which are incorporated herein by reference.

TECHNICAL FIELD

The present application relates to the technical field of automobile brake, and more particularly, to an automobile brake control method based on an anti-lock braking system (ABS), a system, and a storage medium.

BACKGROUND

When a high-speed automobile passes through a road with a water layer, a rising component of a dynamic pressure of the water will be equal to a vertical load of the tires after the automobile speed reaches a certain value, since tires travel at a high speed on the road covered by the water film. As a result, the tires are completely off the ground, causing the wheels to lock up. In short, the above-mentioned phenomenon in which the tires float due to a fluid pressure is called "aquaplaning".

It is very dangerous if the aquaplaning phenomenon occurs frequently. When the aquaplaning phenomenon occurs, the tires are almost completely floating on the water surface, which makes an anti-lock braking system (ABS) and other control devices unable to function, resulting in an extremely low longitudinal and lateral adhesion of the automobile, which is prone to a side slipping phenomenon and a tail-drifting phenomenon.

Therefore, there is an urgent need for an automobile brake control method, which can make the ABS continue to function when the aquaplaning phenomenon occurs, thereby reducing a probability of side slipping and tail-drifting phenomenon of the automobile.

SUMMARY

There are provided an automobile brake control method, a system and, and a storage medium according to embodiments of the present disclosure. The technical solution is as below:

According to a first aspect of embodiments of the present disclosure, there is provided an embodiment of the present invention provides an automobile brake control method, comprising:
  acquiring an information of the wheel speed sensor of an automobile in a current detection period;
  allowing the automobile enter an aquaplaning safety logic control mode when the information of the wheel speed sensor satisfies preset conditions, and allowing an anti-lock braking system (ABS) exit a front axle control and only control a rear axle after the ABS works, to make a driver take over an automobile brake control until a next detection period.

According to a second aspect of embodiments of the present disclosure, there is provided an automobile brake control system, comprising:
  an information of the wheel speed sensor acquisition unit, configured to acquire a information of the wheel speed sensor of an automobile in a current detection period; and
  an aquaplaning safety logic control unit, configured to allow the automobile enter an aquaplaning safety logic control mode when the information of the wheel speed sensor satisfies preset conditions, and allow an ABS exit a front axle control and only control a rear axle after the ABS works, to make a driver take over an automobile brake control until a next detection period.

According to a third aspect of embodiments of the present disclosure, there is provided a non-transitory computer-readable storage medium having stored therein instructions that, when executed by a processor of an automobile brake control system, causes the automobile brake control system to perform automobile brake control method, the method comprising:
  acquiring an information of the wheel speed sensor of an automobile in a current detection period;
  allowing the automobile enter an aquaplaning safety logic control mode when the information of the wheel speed sensor satisfies preset conditions, and allowing an anti-lock braking system ABS exit a front axle control and only control a rear axle after the ABS works, to make a driver take over an automobile brake control until a next detection period.

BRIEF DESCRIPTION OF THE DRAWINGS

In order to illustrate technical solutions of embodiments of the present application or technical solutions of the prior art more clearly, the drawings that are used in the description of the embodiments of the present application or the prior art will be introduced briefly as follows. Obviously, the drawings in the following description are only some embodiments of the present application, for those of ordinary skill in the art, other drawings may also be obtained from these drawings without creative labor.

DETAILED DESCRIPTION

In order to make an object, technical solutions and advantages of the present invention clearer, the present invention will be further described in detail below with reference to the accompanying drawings.

Figure 1:
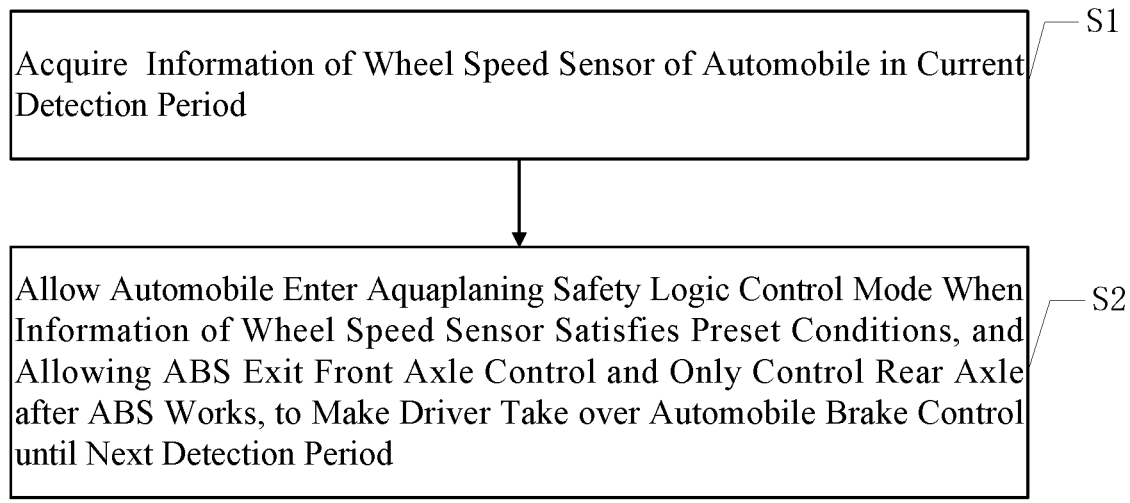
FIG. 1 is a flowchart of an automobile brake control method according to an embodiment of the present invention.

As shown in FIG. 1, an embodiment of the present invention provides an automobile brake control method, including the following steps.

Step S1: information of a wheel speed sensor of an automobile in a current detection period is acquired.

A specific process is as follows: firstly, the detection period is determined, such as a period with a time of 5 S or 10 S. Secondly, the information of the wheel speed sensor of the automobile in the current detection period is acquired based on an angular velocity signal collected by wheel speed sensors on automobile wheels, that is, the information of the wheel speed sensor is acquired through a calculation and a simulation of the angular velocity signal. The information of the wheel speed sensor includes but not limited to an automobile speed, a wheel drift rate, a wheel speed recovery slope and a duration of two wheels in the front axle, a wheel speed recovery slope and a duration of a single wheel in the front axle.

Step S2: the automobile is allowed to enter an aquaplaning safety logic control mode when the information of the wheel speed sensor satisfies preset conditions, and an anti-lock braking system (ABS) is allowed to exit a front axle control and only control a rear axle after the ABS works, to make a driver take over an automobile brake control until a next detection period.

A specific process is as allows: firstly, preset conditions are set according to the information of the wheel speed sensor, and the preset conditions include: the automobile speed is greater than an automobile speed target value (e.g., 80 km/h), the wheel drift rate is greater than a target percentage (e.g., 40%), and the wheel speed recovery slope of the two wheels in the front axle is less than a first value (e.g., 1.9) and the duration of the two wheels in the front axle is greater than a first time threshold (e.g., 1.2 S). Alternatively, the preset conditions include: the automobile speed is greater than the automobile speed target value (e.g., 80 km/h), the wheel drift rate is greater than the target percentage (e.g., 40%), and the wheel speed recovery slope of the single wheel in the front axle is less than a second value (e.g., 1.9) and the duration of the single wheel in the front axle is greater than a second time threshold (e.g., 1.7 S).

Secondly, if it is determined that the information of the wheel speed sensor obtained in the current detection period satisfies the preset conditions, the automobile is allowed to enter the aquaplaning safety logic control mode.

Then, in view of the aquaplaning condition, a rising component of the dynamic pressure of the water is equal to a vertical load of the tires, which will cause the tires to completely separate from the ground and cause the wheels to lock, so the ABS is usually activated to prevent the wheels from locking. In this circumstance, the ABS cannot judge a wheel drift rate by the wheel speed (it is determined by the ABS that the wheel speed is invalid or inaccurate, in order to prevent a mis-control), so the ABS exits a front axle control by releasing a pressure of the front axle, and return the automobile control to the driver. The ABS only controls a rear axle to ensure a stability of the automobile and prevent the rear wheels from locking until the next detection period. Therefore, the ABS can continue to function when the aquaplaning phenomenon occurs, so as to reduce the probability of side slipping and tail-drifting phenomenon of the automobile.

It should be noted that, after the automobile enters the aquaplaning safety logic control mode in the current detection period, the driver panics due to the ABS exit and the brake pedal sinking, so it is necessary to automatically turn on a red warning light of an automobile instrument by collecting a pressing signal generated by the brake pedal being pressed on by the driver, after the automobile enters the aquaplaning safety logic control mode in the current detection period, so as to alert the driver to a dangerous operating condition.

It should be noted that the ABS controls four wheels of the front and rear axles separately through an operation of pressurizing and depressurizing on the front and rear axles.

In an embodiment of the present invention, after the next detection period arrives, if the acquired information of the wheel speed sensor of the next detection period does not satisfy one of the preset conditions, the automobile is allowed to exit the aquaplaning safety logic control mode, so that the ABS restores the control for the front axle and further turns off the red warning light of the automobile instrument.

It can be understood that, after the next detection period arrives, if the acquired information of the wheel speed sensor of the next detection period satisfies all of the preset conditions, the automobile continues to be maintained in the aquaplaning safety logic control mode.

Figure 2:
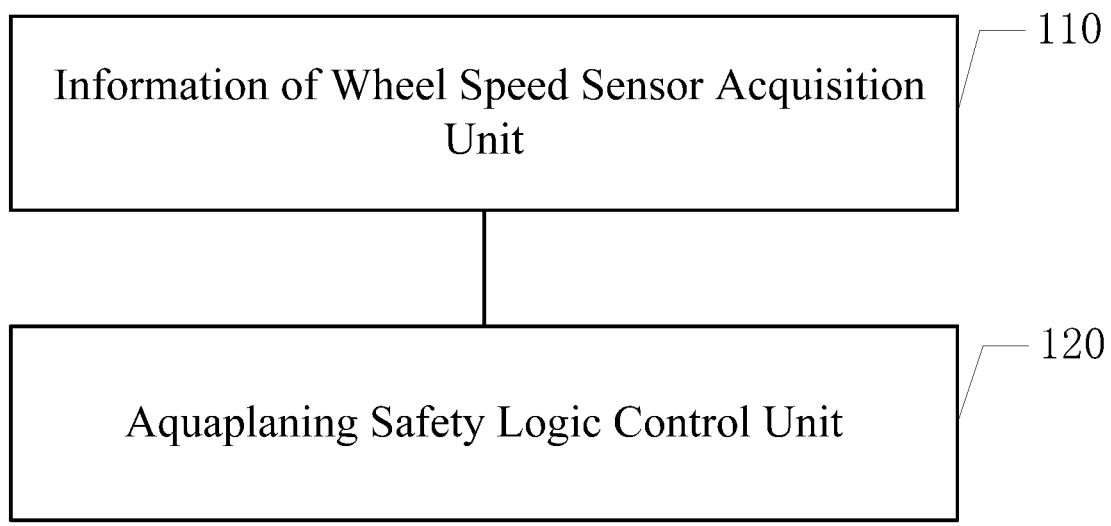
FIG. 2 illustrates a structural diagram of an automobile brake control system according to an embodiment of the present invention.

As shown in FIG. 2, an embodiment of the present invention provides an automobile brake control system, deploy in an automobile, including a processor, a memory for storing program executable by the processor, an information of the wheel speed sensor acquisition unit 110 and an aquaplaning safety logic control unit 120.

The information of the wheel speed sensor acquisition unit 110 is configured to acquire an information of the wheel speed sensor of an automobile in a current detection period.

The aquaplaning safety logic control unit 120 is configured to allow the automobile enter an aquaplaning safety logic control mode when the information of the wheel speed sensor satisfies preset conditions, and allow an ABS exit a front axle control and only control a rear axle after the ABS works, to make a driver take over an automobile brake control until a next detection period.

The system further includes a danger alerting unit 130.

The danger alerting unit 130 is configured to automatically turn on a red warning light of an automobile instrument by collecting a pressing signal generated by a brake pedal being pressed on by the driver, to alert the driver to a dangerous operating condition, after the automobile enters the aquaplaning safety logic control mode in the current detection period.

The system further includes an aquaplaning safety logic control exit unit 140.

The aquaplaning safety logic control exit unit 140 is configured to allow the automobile exit the aquaplaning safety logic control mode, allow the ABS control the front axle again, and further turn off the red warning light of the automobile instrument.

The information of the wheel speed sensor is obtained based on an angular speed signal collected by wheel speed sensors on the automobile wheels, including an automobile speed, a wheel drift rate, a wheel speed recovery slope and a duration of two wheels in a front axle, and a wheel speed recovery slope and a duration of a single wheel in the front axle.

The preset conditions include: the vehicle speed is greater than a vehicle speed target value, the wheel drift rate is greater than a target percentage, and the wheel speed recovery slope of the two wheels in the front axle is less than a first value and the duration of the two wheels in the front axle is greater than a first time threshold.

Alternatively, the preset conditions include: the vehicle speed is greater than the vehicle speed target value, the wheel drift rate is greater than the target percentage, and the wheel speed recovery slope of the single wheel in the front axle is less than a second value and the duration of the single wheel in the front axle is greater than a second time threshold.

The embodiments of the present invention have the following beneficial effects:

The present invention can allow the automobile enter an aquaplaning safety logic control mode and allow the ABS exit a front axle control and only control a rear axle after the ABS works, to make a driver take over an automobile brake control, when the wheels are locked in an aquaplaning condition, the wheel speed recovery is slow, and the ABS cannot read the real wheel speed, so that the ABS can continue to function when an aquaplaning condition occurs, thereby reducing a probability of side slipping and tail-drifting phenomenon of the automobile.

It is worth noting that, in the above-mentioned embodiments of the system, each system unit included is only divided according to functional logic, but is not limited to the above-mentioned division, as long as the corresponding function can be realized. In addition, specific names of each functional unit are only for the convenience of distinguishing from each other, and are not used to limit the protection scope of the present invention.

Those skilled in the art can understand that all or part of the steps in the methods of the above embodiments may be implemented by instructing relevant hardware through a program. The program may be stored in a computer-readable storage medium, such as Read Only Memory (ROM), Random Access Memory (RAM), magnetic disk and optical disk. When the program is executed by a processor, the above automobile brake control method is performed.

The above disclosures are only preferred embodiments of the present invention, which, of course, cannot limit the scope of the rights of the present invention. Therefore, equivalent changes made according to the claims of the present invention are still within the scope of the present invention.

What is claimed is:

1. An automobile brake control method based on an anti-lock braking system (ABS), applied to an aquaplaning condition, comprising:
   acquiring information of a wheel speed sensor of an automobile in a current detection period based on an angular velocity signal collected by the wheel speed sensor on a wheel of the automobile;
   allowing the automobile enter an aquaplaning safety logic control mode when the information of the wheel speed sensor satisfies preset conditions, and allowing the ABS to exit a front axle control and to only control a rear axle until a next detection period;
   automatically turning on a red warning light of an automobile instrument by collecting a pressing signal generated by a brake pedal being pressed on by the driver, after the automobile enters the aquaplaning safety logic control mode in the current detection period; and
   allowing the automobile exit to the aquaplaning safety logic control mode, allowing the ABS to control the front axle, and further turning off the red warning light of the automobile instrument after the next detection period arrives, in response to that an acquired information of the wheel speed sensor in the next detection period does not satisfy the preset conditions.

2. The automobile brake control method of claim 1, wherein the information of the wheel speed sensor comprises at least one of an automobile speed, a wheel drift rate, a wheel speed recovery slope and a duration of two wheels in the front axle, and a wheel speed recovery slope and a duration of a single wheel in the front axle.

3. The automobile brake control method of claim 2, wherein the preset conditions comprise: the automobile speed is greater than an automobile speed target value, the wheel drift rate is greater than a target percentage, the wheel speed recovery slope of the two wheels in the front axle is less than a first value and the duration of the two wheels in the front axle is greater than a first time threshold; or
   the preset conditions comprise: the automobile speed is greater than the automobile speed target value, the wheel drift rate is greater than the target percentage, the wheel speed recovery slope of the single wheel in the front axle is less than a second value and the duration of the single wheel in the front axle is greater than a second time threshold.

4. An automobile brake control system based on an anti-lock braking system (ABS), deploy in an automobile, comprising:
   a processor; and
   a memory for storing program executable by the processor;
   wherein the processor is configured to perform an automobile brake control method based on an anti-lock braking system, applied to an aquaplaning condition, wherein the automobile brake control method comprises:
   acquiring information of a wheel speed sensor of an automobile in a current detection period based on an angular velocity signal collected by the wheel speed sensor on a wheel of the automobile; and
   allowing the automobile enter an aquaplaning safety logic control mode when the information of the wheel speed sensor satisfies preset conditions, and allowing the ABS to exit a front axle control and to only control a rear axle until a next detection period;
   automatically turning on a red warning light of an automobile instrument by collecting a pressing signal generated by a brake pedal being pressed on by the driver, after the automobile enters the aquaplaning safety logic control mode in the current detection period; and
   allowing the automobile exit to the aquaplaning safety logic control mode, allowing the ABS to control the front axle, and further turning off the red warning light of the automobile instrument after the next detection period arrives, in response to that an acquired information of the wheel speed sensor in the next detection period does not satisfy the preset conditions.

5. The automobile brake control system of claim 4, wherein the information of the wheel speed sensor obtained based on an angular speed signal collected by wheel speed sensors on the automobile wheels comprises at least one of an automobile speed, a wheel drift rate, a wheel speed recovery slope and a duration of two wheels in the front axle, and a wheel speed recovery slope and a duration of a single wheel in the front axle.

6. The automobile brake control system of claim 5, wherein the preset conditions comprise: the automobile speed is greater than an automobile speed target value, the wheel drift rate is greater than a target percentage, and the wheel speed recovery slope of the two wheels in the front axle is less than a first value and the duration of the two wheels in the front axle is greater than a first time threshold; or
   the preset conditions comprise: the automobile speed is greater than the automobile speed target value, the wheel drift rate is greater than the target percentage, and the wheel speed recovery slope of the single wheel in the front axle is less than a second value and the duration of the single wheel in the front axle is greater than a second time threshold.

7. A non-transitory computer-readable storage medium having stored therein instructions that, when executed by a processor of an automobile brake control system based on an anti-lock braking system (ABS), causes the automobile brake control system to perform an automobile brake control method based on the anti-lock braking system, applied to an aquaplaning condition, the method comprising:

acquiring information of a wheel speed sensor of an automobile in a current detection period based on an angular velocity signal collected by the wheel speed sensor on a wheel of the automobile; and allowing the automobile enter an aquaplaning safety logic control mode when the information of the wheel speed sensor satisfies preset conditions, and allowing the ABS to exit a front axle control and to only control a rear axle until a next detection period;

automatically turning on a red warning light of an automobile instrument by collecting a pressing signal generated by a brake pedal being pressed on by the driver, after the automobile enters the aquaplaning safety logic control mode in the current detection period; and allowing the automobile exit to the aquaplaning safety logic control mode, allowing the ABS to control the front axle, and further turning off the red warning light of the automobile instrument after the next detection period arrives, in response to that an acquired information of the wheel speed sensor in the next detection period does not satisfy the preset conditions.

8. The non-transitory computer-readable storage medium of claim 7, wherein the information of the wheel speed sensor comprises at least one of an automobile speed, a wheel drift rate, a wheel speed recovery slope and a duration of two wheels in the front axle, and a wheel speed recovery slope and a duration of a single wheel in the front axle.

9. The non-transitory computer-readable storage medium of claim 8, wherein the preset conditions comprise: the automobile speed is greater than an automobile speed target value, the wheel drift rate is greater than a target percentage, the wheel speed recovery slope of the two wheels in the front axle is less than a first value and the duration of the two wheels in the front axle is greater than a first time threshold; or the preset conditions comprise: the automobile speed is greater than the automobile speed target value, the wheel drift rate is greater than the target percentage, the wheel speed recovery slope of the single wheel in the front axle is less than a second value and the duration of the single wheel in the front axle is greater than a second time threshold.

\* \* \* \* \*